(12) United States Patent
Lev-Ran et al.

(10) Patent No.: US 7,506,102 B2
(45) Date of Patent: Mar. 17, 2009

(54) METHOD AND APPARATUS FOR LOCAL ACCESS AUTHORIZATION OF CACHED RESOURCES

(75) Inventors: Etai Lev-Ran, Sunnyvale, CA (US); Daniel Kaminsky, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 351 days.

(21) Appl. No.: 11/392,317

(22) Filed: Mar. 28, 2006

(65) Prior Publication Data

US 2007/0233957 A1    Oct. 4, 2007

(51) Int. Cl.
G06F 12/00 (2006.01)
G06F 12/14 (2006.01)
(52) U.S. Cl. ............................. 711/118; 707/9; 726/21
(58) Field of Classification Search ................ 711/118; 707/9; 726/4, 17, 21
See application file for complete search history.

(56) References Cited

U.S. PATENT DOCUMENTS

| | | | |
|---|---|---|---|
| 5,889,952 A * | 3/1999 | Hunnicutt et al. | 709/219 |
| 6,408,298 B1 * | 6/2002 | Van et al. | 707/10 |
| 6,463,474 B1 * | 10/2002 | Fuh et al. | 709/225 |
| 2003/0200466 A1 * | 10/2003 | Nelson et al. | 713/202 |
| 2004/0064721 A1 * | 4/2004 | Murching et al. | 713/200 |
| 2004/0086089 A1 * | 5/2004 | Naidoo et al. | 379/37 |
| 2004/0093517 A1 * | 5/2004 | Cihula | 713/201 |
| 2004/0193906 A1 * | 9/2004 | Dar et al. | 713/200 |
| 2005/0120029 A1 * | 6/2005 | Tomic et al. | 707/100 |

FOREIGN PATENT DOCUMENTS

WO    WO 0019697 A1 *   4/2000

OTHER PUBLICATIONS

Storage Networking Industry Association, "Common Internet File System (CIFS) Technical Reference, Revision: 1.0", SNIA Technical Proposal, Release Date: Mar. 1, 2002, 150 pgs.
B. Callaghan, et al., "NFS Version 3 Protocol Specification", Memo, Network Working Group Request for Comments: 1813, dated Jun. 1995, 113 pgs.
S. Shepler, "Network File System (NFS) Version 4 Protocol", Memo, Network Working Group Request for Comments: 3530, dated Apr. 2003, 245 pgs.

* cited by examiner

Primary Examiner—Pierre-Michel Bataille
Assistant Examiner—Michael C Krofcheck
(74) Attorney, Agent, or Firm—Hickman Palermo Truong & Becker LLP

(57) ABSTRACT

A method and apparatus is disclosed for local access authorization of cached resources. A first request to perform an operation on a first object that is stored in a cache is received. An entity identifier associated with the entity that sent the first request, an operation identifier associated with the operation, and an Access Control List (ACL) associated with the first object are determined based on the first request. A record that includes at least the operation identifier, the ACL, and an authorization indicator is accessed. The authorization indicator indicates whether the entity has previously successfully performed the operation on any object in the cache that is associated with the ACL. Based on the authorization indicator included in the record, a determination is made whether to authorize the entity to perform the operation on the first object.

38 Claims, 6 Drawing Sheets

Fig. 3A

| Entity ID | Operation ID | ACL | Authorization Indicator | Time-to-Live Indicator |
|---|---|---|---|---|
| 2110791508 | OPEN_FILE | 0x801F0000 | success | fresh |
| 7530200520 | READ_FILE | 0x10020000 | success | expired |
| 2110791508 | LIST_DIRECTORY | 0x0000FFFF | fail | fresh |
| ... | ... | | | |

Fig. 3B

| Operation ID | ACL | Authorization Indicator | Time-to-Live Indicator |
|---|---|---|---|
| OPEN_FILE | 0x801F0000 | success | fresh |
| READ_FILE | 0x10020000 | success | expired |
| LIST_DIRECTORY | 0x0000FFFF | fail | fresh |
| ... | ... | | |

METHOD AND APPARATUS FOR LOCAL ACCESS AUTHORIZATION OF CACHED RESOURCES

FIELD OF THE INVENTION

The present invention generally relates to content caching in a networking environment. The invention relates more specifically to access authorization for cached resources.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A content cache is a computer-readable medium that stores copies of objects or other resources. The original objects or resources are typically maintained by a remote server or servers, which are communicatively connected to the server maintaining the cache. Examples of such content caches include, but are not limited to, file caches and web caches. A cache improves network performance by storing copies of the objects or resources closer to the users or clients that need to access them. For example, a file cache managed by a local cache server may store copies of files and directories, the originals of which are maintained by a remote file server. When a user or a client sends a request to access a file, the local cache server checks to determine whether a copy of the requested file is stored in the cache. If a copy of the file is stored in the cache, then the local cache server may service the received request without the client communicating with the remote file server over a possibly slow communication link.

In some operational contexts, a local cache server may need to verify that a user or a client has access rights to a cached object before the local cache server allows the user or the client to access the object in the cache. Verifying the access rights of a user or a client to a cached object, however, has some serious disadvantages that may impede network performance and/or increase the latency in accessing the object in the cache.

For example, objects stored in a cache may have Access Control Lists (ACLs) associated with them. An ACL is a set of data that indicates the permissions, privileges, and/or access rights that various entities have to an associated object. An ACL associated with an object may include one or more entries, where each entry may identify a user or a group of users, the permissions associated with the user or the group, and the access rights to the object for the user or the group. When a user requests access to an object that is found in the cache, a local cache server uses one of two approaches to validate the user's rights to the cached object based on an ACL associated with the object.

In one approach, a local cache server retrieves the ACL associated with a requested cached object from a remote server that manages the original of the object. The local server then processes the ACL locally and determines whether the user or client requesting access to the cached object should be allowed to do so. Thus, this approach basically amounts to retrieving the ACL from the remote authoritative server and mimicking the authorization operations performed by the remote server.

One disadvantage of this approach is that it requires knowledge of the structure of the ACL and the authorization evaluation mechanism used by the remote server to processes the ACL in order to determine whether to grant or deny access. For example, a user may be granted access to an object because the user is part of a specific group, because the user is assigned a specific role, or because the user herself is specifically allowed to access the resource. Thus, in this approach, the local cache server needs to know how the ACL is structured in order to determine how to parse the ACL. In addition, the local cache server may need to identify a user or a client's principal identity, the user or client's group membership and roles, and then match those with the corresponding information stored in the ACL. In this approach, the local server also needs to know the authorization mechanism because it needs to apply the mechanism to the retrieved ACL in exactly the same way, and reach exactly the same decision, as if the mechanism were applied by the remote authoritative server.

In the other approach for validating access rights to cached objects, a local cache server delegates the authorization to the remote authoritative server. This means that whenever a local cache server receives a request from a user to perform an operation on a particular cached object, the request is sent to the remote server managing the original object to determine whether the user has access right to perform the operation. If the remote server grants access, then the local cache server performs the operation on the cached object on behalf of the user.

One disadvantage of this approach is that it requires at least one roundtrip communication to the remote server for each operation that a user attempts to perform on a cached object. The delay in performing an operation on a cached object caused by such roundtrip communication, however, is very significant when the remote server is connected to the local cache server over a slow communication link and/or when multiple cached objects are accessed and require authorization in response to a single logical client operation. For example, a single client logical operation (e.g. double click a directory) may be translated by the underlying protocol to multiple disjoint operations (e.g. directory listing retrieval, followed by retrieval of attributes per entry, followed by reading of some metadata, such as graphical icons or picture thumbnails, from a subset of the entries). In another example, the remote server may be connected to the local cache server over a Wide Area Network (WAN), in which the communication links are of low bandwidth and high latency. In another typical example, the remote server may be connected to the local cache server over a dial-up or other similar high latency point-to-point communication link.

Based on the foregoing, there is a clear need for a technique for local access authorization of cached resources that overcomes the disadvantages of the approaches described above.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3A is a block diagram that illustrates an overview of the structure of a global authorization cache table according to one embodiment;

FIG. 3B is a block diagram that illustrates an overview of the structure of a per-entity authorization cache table according to one embodiment.

DETAILED DESCRIPTION

Figure 1A:
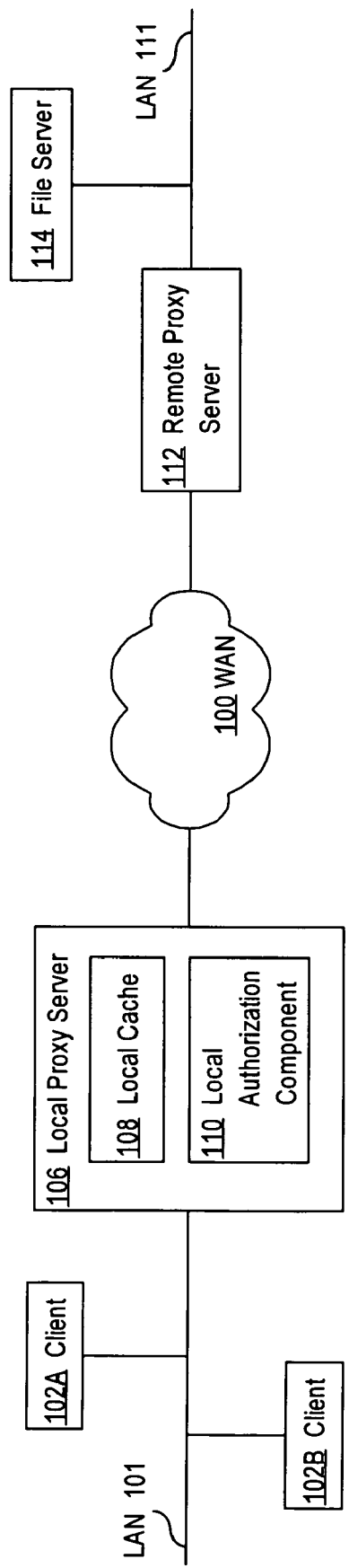
FIG. 1A is a block diagram that illustrates an overview of one operational context in which an embodiment may be implemented.

A method and apparatus for local access authorization of cached resources is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method for Local Access Authorization of Cached Resources
   3.1 Retrieving and Caching ACLs
   3.2 Maintaining Authorization Cache Records
   3.3 Processing Local Authorization Requests
4.0 Implementation Mechanisms—Hardware Overview
5.0 Extensions and Alternatives 1.0 General Overview The needs identified in the foregoing Background, and other needs and objects that will become apparent for the following description, are achieved in the present invention, which comprises, in one aspect, a method for local access authorization of cached resources. A first request to perform an operation on a first object that is stored in a cache is received. An entity identifier associated with the entity that sent the first request, an operation identifier associated with the operation, and an Access Control List (ACL) associated with the first object are determined based on the first request. A record that includes at least the operation identifier, the ACL, and an authorization indicator is accessed. The authorization indicator indicates whether the entity has previously successfully performed the operation on any object that is associated with the ACL. Based on the authorization indicator included in the record, a determination is made whether to authorize the entity to perform the operation on the first object.

In one feature of this aspect, a determination is made as to whether the record is stored in an authorization cache based on the entity identifier, the operation identifier, and the ACL. If the record is not stored in the authorization cache, then an authorization request is sent to a remote server. The remote server is configured to authorize performing the operation on objects associated with the ACL. A response is received from the remote server. The response indicates whether the remote server authorizes the entity to perform the operation on the first object. Based at least on the response, the authorization indicator is generated. The record that includes the entity identifier, the operation identifier, the ACL, and the authorization indicator is then stored in the authorization cache.

In a feature of this aspect, a second request from the same entity to perform the same operation on a second object is received. The second object is also associated with the same ACL. Based on information included in the second request, which may include the entity identifier, the operation identifier and the ACL associated with the second object are determined. Based on the entity identifier, the operation identifier, and the ACL, the record is located in the authorization cache. Based on the authorization indicator included in the record, a determination is made whether to perform the operation on the second object. In this feature, the second object may be the same as the first object. In other features, the second object may be different than the first object.

In one feature of this aspect, the record stored in the authorization cache further includes a time-to-live indicator, which indicates whether the authorization indicator has expired. In this feature, the record is located in the authorization cache based on the entity identifier, the operation identifier, and the ACL. A determination is made whether the time-to-live indicator indicates that the authorization indicator has expired. If the authorization indicator has expired, then an authorization request is sent to a remote server. The remote server is configured to authorize performing the operation on objects associated with the ACL. A response is received from the remote server. The response indicates whether the remote server authorizes the entity to perform the operation on the first object. Based at least on the response, a new authorization indicator is generated. The new authorization indicator is stored in the record in place of the expired authorization indicator. In this feature, the time-to-live indicator may be set to indicate that the authorization indicator has expired in response to one or more of: receiving a notification that the ACL has changed relative a particular object that was associated with the ACL; detecting that the entity identifier was changed; and the expiration of a certain period of time.

In a feature of this aspect, the entity is any one of a user, a client, an application, and a process, that is capable of being uniquely identified based on the first request.

In one feature of this aspect, the first request is received from a client that is communicatively connected over a Local Area Network (LAN).

In a feature of this aspect, the cache stores a plurality of file system objects. In this feature, the first object may be a file or a directory.

In one feature of this aspect, the operation is one of a plurality of operations that are supported by any one of a Common Internet File System Protocol (CIFS), a Network File System (NFS) protocol, and a Web-based Distributed Authoring and Versioning (WebDAV) protocol.

In a feature of this aspect, a remote server, which is communicatively connected over a Wide Area Network (WAN), is configured to authorize performing operations on objects stored in the cache and associated with the ACL.

In a feature of this aspect, a plurality of distinct ACLs is stored in the cache. In this feature, for each object stored in the cache, the cache stores a reference to a particular ACL, of the plurality of distinct ACLs, that is associated with that object.

In another aspect, a method for local access authorization of resources stored in a cache is provided. A first request to perform an operation on a first object stored in the cache is received from an entity. The operation is performed on the first object, where performing the operation includes: sending an authorization request to a remote authorization server, where the remote authorization server is capable of authorizing the entity to perform the operation; and receiving a response from the remote authorization server, where the response indicates whether the remote authorization server authorizes the entity to perform the operation on the first object. Based at least on the response, an authorization indicator is generated. The authorization indicator indicates whether the operation was successfully performed on the first object. A record is stored in an authorization cache. The record includes the authorization indicator, an entity identifier associated with the entity, an operation identifier associated with the operation, and an ACL associated with the first object. A second request to perform the operation on a second object stored in the cache is received from the entity, where the second object is also associated with the same ACL. Based on the second request, the entity identifier, the operation identifier, and the ACL are determined. Based on the entity identifier, the operation identifier, and the ACL, the record is located in the authorization cache. Based on the authorization indicator stored in the record, a determination is made whether to authorize the entity to perform the operation on the second object.

In one feature of this aspect, a local proxy server manages the cache. In this feature, the local proxy server is communicatively connected to one or more clients over a first LAN, where a particular client of the one or more clients sends the first request and the second request. The local proxy server may be communicatively connected to a remote proxy server over a WAN, where the remote proxy server is communicatively connected to the remote authorization server over a second LAN. Alternatively, the local proxy server may be communicatively connected directly to the remote authorization server over the WAN.

In a feature of this aspect, a local cache server manages the cache. In this feature, the local cache server is communicatively connected to the remote authorization server over a LAN.

In other aspects, the invention encompasses a computer apparatus and a computer-readable medium configured to carry out the foregoing steps.

2.0 Structural and Functional Overview

FIG. 1A is a block diagram that illustrates an overview of one operational context in which an embodiment of the techniques for local access authorization of cached resources may be implemented. This operational context may represent portions of the network infrastructure of a geographically dispersed enterprise, in which LAN 111 is established at the main office of the enterprise, and LAN 101 is established at a branch office. The branch office LAN 101 is communicatively connected to the main office LAN 111 over WAN 100.

In the operational context depicted in FIG. 1A, remote proxy server 112 is established in LAN 111, and serves as a proxy for various services and data resources provided to remote enterprise clients by servers established in LAN 111, such as, for example, file server 114. Remote proxy server 112 is communicatively connected to local proxy server 106 over WAN 100. Local proxy server 106 is established in LAN 101, and is communicatively connected to one or more clients, such as, for example, clients 102A and 102B. Local proxy server 106 serves as a proxy for clients and servers established in LAN 101 that need to access services and data resources provided in LAN 111.

Local proxy server 106 comprises at least local cache 108 and local authorization component 110. In the operational context depicted in FIG. 1A, local cache 108 stores copies of file system objects, the originals of which are maintained at remote file servers, such as, for example, file server 114 in LAN 111. According to the techniques described herein, local cache 108 includes an authorization cache. The authorization cache stores the ACLs associated with the cached file system objects. The authorization cache also stores a set of records. Each record in the set represents an association of a specific entity, a specific operation, and a specific ACL with an authorization indicator. The authorization indicator is a value that indicates whether the specific entity has previously successfully performed the specific operation on any object stored in the cache that is associated with the specific ACL.

Local authorization component 110 is configured to perform local authorization of objects cached in local caches, such as local cache 108, according to the techniques described herein. Local authorization component 110 may also maintain the authorization cache that includes the cached ACLs and the authorization records. In different embodiments, local authorization component 110 may be implemented in a variety of ways including, but not limited to, as a library of functions, as set of one or more modules, as a package of object-oriented classes, as a dynamically linked library, and as an Application Programming Interface. Local proxy server 106 may execute local authorization component 110 in a variety of ways including, but not limited to, a process, a thread in a process, a standalone application, a client, and a service.

In operation, suppose that a user uses a client, such as, for example, client 102A, to access a file maintained by a server in a remote LAN, such as, for example, file server 114 in LAN 111. According to the techniques described herein, client 102A sends a request to access the file to local proxy server 106. Local proxy server 106 receives the request, and based on the request, may determine the identity of the user and the identity of the operation to be performed on the file. Alternatively, local proxy server 106 may have already determined the user identity, which may have been part of a larger "session" encompassing multiple requests. Based on the request, local proxy server 106 also determines that a copy of the file is cached in local cache 108, and the ACL associated with the cached file. Based on a user identifier associated with the user, an operation identifier associated with the operation, and the ACL associated with the file, local authorization component 110 determines whether the authorization cache stores a valid record associating the user, the operation, and the ACL. If local authorization component 110 locates such a record in the authorization cache, then based on the authorization indicator stored in the record, local authorization component 110 determines whether to authorize the user to perform the operation on the cached file.

Figure 1B:
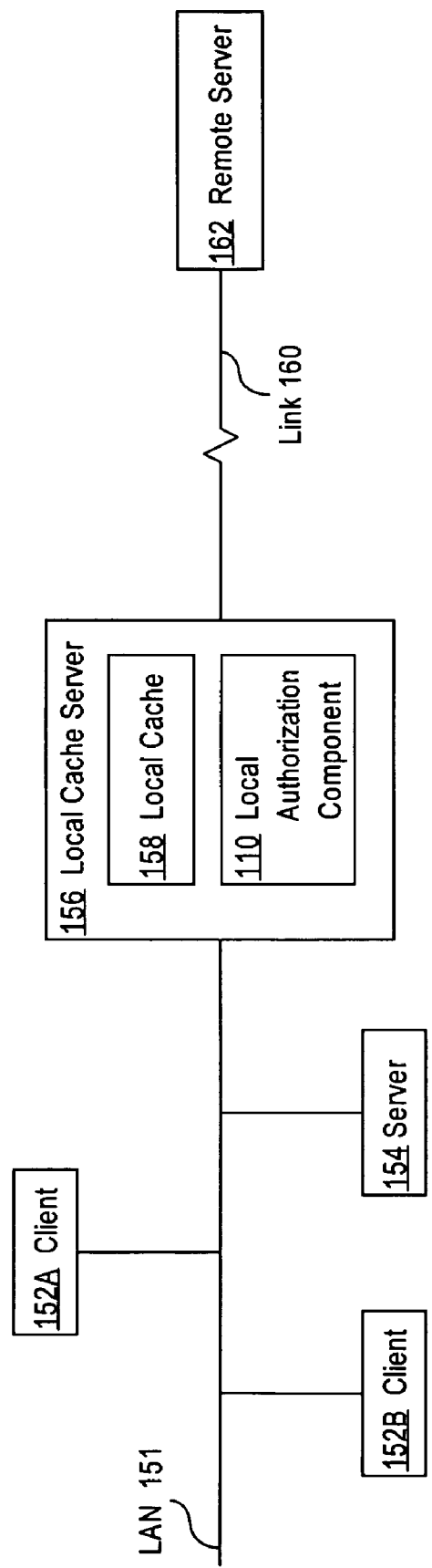
FIG. 1B is a block diagram that illustrates an overview of another operational context in which an embodiment may be implemented.

FIG. 1B is a block diagram that illustrates an overview of another operational context in which an embodiment of the techniques described herein may be implemented. In this operational context, remote server 162 is communicatively connected to local cache server 156 over communication link 160. Local cache server 156 is established in LAN 151, and is communicatively connected to one or more clients and servers established in the LAN, such as, for example, server 154 and clients 152A and 152B.

In various embodiments implemented in this operational context, remote server 162 may be any server capable of providing resources that may be cached by local cache server 156. Examples of remote server 162 include, but are not limited to, a file server, a web server, a database server, an e-mail server, a print server, a server connected in a Storage Area Network (SAN), a Domain Name Service (DNS) server, and a directory server such as, for example, an X.500 directory server or an LDAP server. Further, in the various embodiments, communication link 160 may be any type of now known or later developed communication link including, but not limited to, a dial-up connection, a Digital Subscriber Line (DSL) connection, an Integrated Services Digital Network (ISDN) connection, a SAN connection, a LAN connection, and a WAN connection.

In various embodiments implemented in this operational context, local cache server 156 comprises at least local cache 158 and local authorization component 110. Local cache 158 stores copies of objects or other resources that are provided by remote server 162. Local cache 158 includes an authorization cache similar to the authorization cache described above with respect to local cache 108 in FIG. 1A. Local cache server 156 also includes local authorization component 110, which is configured to perform local authorization of objects and resources cached in local cache 158 in a similar manner as described above with respect to local authorization component 110 depicted in FIG. 1A.

The techniques described herein may be implemented in various other operational contexts that are different than the operational contexts depicted in FIGS. 1A and 1B. For example, the techniques for local access authorization described herein may be implemented by a standalone file server to cache authorization information and not process all access requests for complete ACL evaluation. An example of such file server is a network file server that exports a file system and that provides access authorization for requests to objects in the file system. Such file server may provide access to objects in the file system in a layered manner, where the upper layers may implemented the techniques described herein to cache authorization information for quicker processing and to avoid complete ACL evaluation for each received access request. Thus, the operational contexts depicted in FIGS. 1A and 1B are to be regarded in an illustrative rather than a restrictive sense.

Figure 2A:
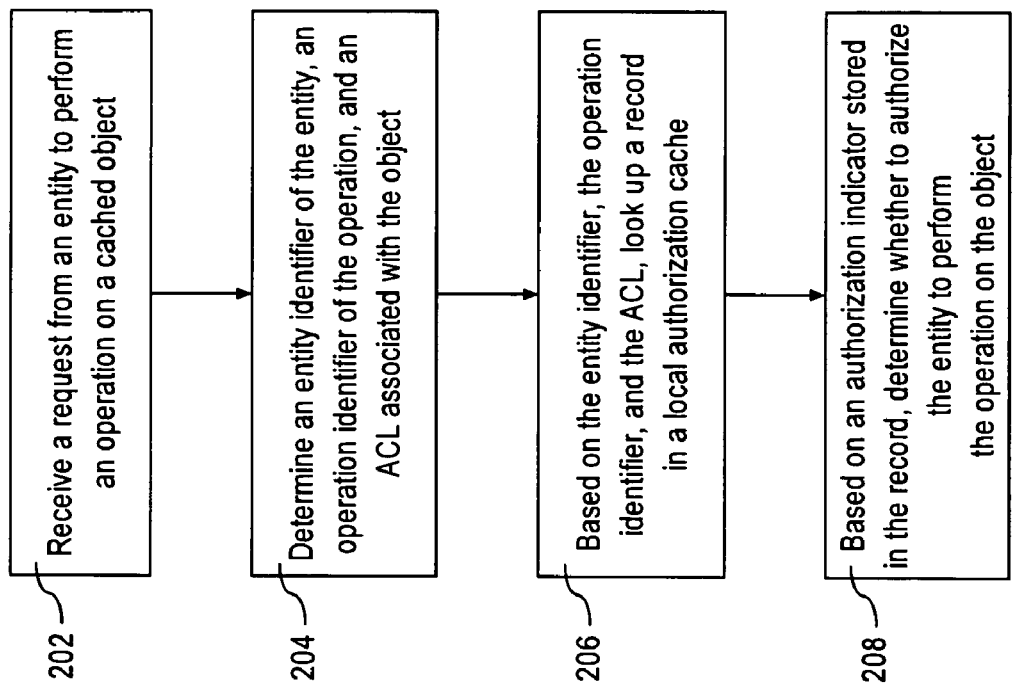
FIG. 2A is a flow diagram that illustrates a high level overview of one embodiment of a method for local access authorization of cached resources.

FIG. 2A is a flow diagram that illustrates a high level overview of one embodiment of a method for local access authorization of cached resources.

In step 202, a request from an entity to perform an operation on a cached object is received at a local cache server, such as local cache server 156 in FIG. 1B. In various embodiments, the entity is any entity that is capable of providing authorization credentials to perform the operation, such as, for example, a user, a client, a server, a service, an application, or a process executing on a computer system. In addition, the request may conform to a particular protocol, such as, for example, CIFS, NFS, or WebDAV.

Based on the received request, in step 204 the local cache server determines an entity identifier associated with the entity, an operation identifier associated with the requested operation, and an ACL associated with the cached object. In some embodiments, the local cache server may determine the ACL by identifying the cached object and then executing a function to query and retrieve the ACL from the object.

In step 206, a local authorization component (such as local authorization component 110 depicted in FIG. 1B) looks up a record in an authorization cache based on the entity identifier, the operation identifier, and the ACL. Such a record, if located in the authorization cache, includes an authorization indicator that is associated with the {entity identifier, operation identifier, ACL} tuple. The authorization indicator indicates whether the same entity has previously successfully performed the same operation on any cached object that is associated with the same ACL. For example, in some embodiments the authorization indicator may be a simple Boolean value that indicates either "success" or "failure", or other similar indications. In some embodiments, the record in the authorization cache may also store a time-to-live indicator that indicates whether the authorization indicator stored in the record has expired.

Based on the authorization indicator stored in the record, in step 208 the local authorization component determines whether to authorize the entity to perform the operation on the cached object. For example, if the authorization indicator is "success", the local authorization component may authorize the entity to perform the operation on the cached object because the entity has previously successfully performed the operation on the same object or on a different object that is associated with the same ACL. If the authorization indicator is "failure", the local authorization component may deny the entity from performing the operation on the cached object because the entity has previously failed to perform the operation on the same object or on a different object that is associated with the same ACL. Alternatively, if the authorization indicator is "failure", the local authorization component may deny the entity from performing the operation and may at the same time send the operation to the remote authorization server. In this asynchronous manner, the local authorization component responds immediately to the request from the entity while the remote authorization server may detect and record any attempts for unauthorized access to objects for auditing and/or accounting purposes. Further, in some embodiments the local authorization component may send only some, but not all, denied requests to the remote authorization server for auditing and/or accounting. The portion of the denied requests that are sent to the remote authorization server may be determined based on time-to-live indicators that are associated with ACLs or on a fixed percentage (e.g. every third request that is denied access).

In this way, the techniques described herein for local access authorization provide a mechanism to identify an entity and an operation that the entity is attempting to perform on a cached object. The techniques described herein also provide for retrieving or determining ACLs associated with cached objects, but do not require extensive knowledge of the structure of the retrieved ACLs. For example, in some embodiments the retrieved ACLs are treated as opaque binary strings that are compared to values stored in an authorization cache records. The techniques described herein do not require any detailed knowledge of, and do not apply to retrieved ACLs, the particular authorization mechanism used by the remote server, which manages the objects associated with the ACLs and is configured to authorize performing operations on these objects. The techniques described herein recognize that the same ACL is typically associated with multiple cached objects. Once the entity, the operation the entity is attempting on a cached object, and the failure or success of a prior application of the same operation by the same entity on the same or different object that has the same ACL, are identified, the operation the entity is attempting on any cached object with the same ACL can be processed (either granted or denied) with respect to the cached object locally without the need to seek authorization resolution from the remote authoritative server. In other words, the authorization result from a specific case (a specific entity performing a specific operation on an object with a specific ACL) is applicable to all other cases where the same entity is attempting to perform the same operation on an object with the same ACL.

In some embodiments, the cached objects may be file system objects, such as, for example, files and directories. Even in a very large file system with a large number of files and directories, there is typically a very small number of distinct ACLs that are associated with these objects. Thus, the information that needs to be stored locally in an authorization cache in order to implement the techniques described herein is of a very small size, which provides for faster access and lookups.

3.0 Method for Local Access Authorization of Cached Resources

Figure 2B:
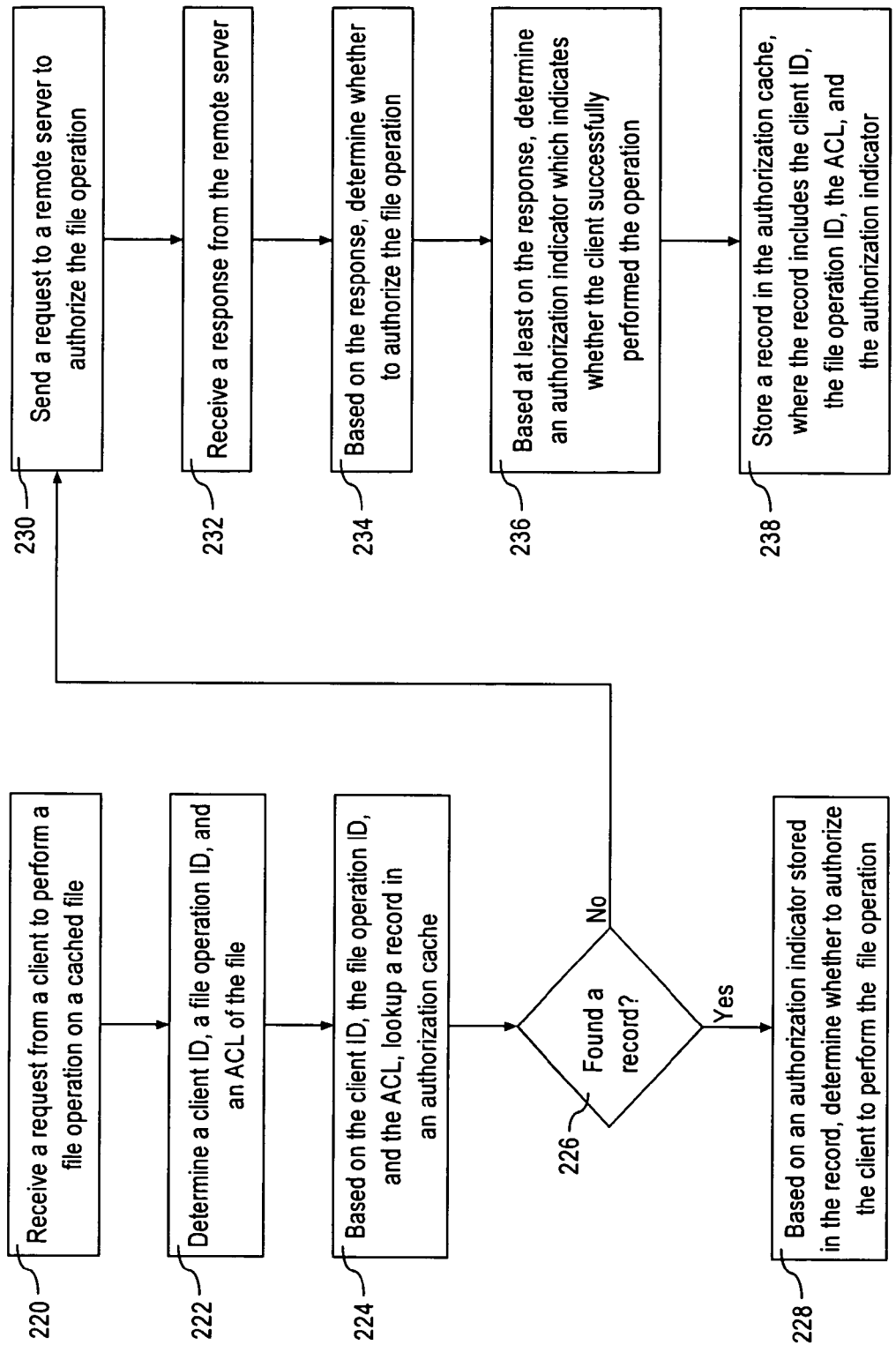
FIG. 2B is a flow diagram that illustrates an overview of a method for local access authorization of cached resources according to one embodiment.

FIG. 2B is a flow diagram that illustrates an overview of a method for local access authorization of cached resources according to one embodiment. In this embodiment, a local cache server manages a cache that stores file system objects, such as, for example, files and directories.

In step 220, the local cache server receives a request from a client to perform an operation on a file that is stored in the cache. Based on the request, in step 222 the local cache server determines a client identifier associated with the client, a file operation identifier associated with the requested operation, and the ACL associated with the cached file.

In step 224, a record is looked up in an authorization cache using the client identifier, the file operation identifier, and the ACL as a key. In some embodiments, the authorization cache may be a table stored in the local cache. In other embodiments, the authorization cache may be organized as any data structure that is stored in a computer-readable medium. In these embodiments, querying the authorization cache may be performed through a variety of mechanisms, such as, for example, APIs and a library of functions.

In step 226, a determination is made whether the authorization cache stores a record that includes the client identifier, the file operation identifier, and the ACL. If such a record is stored in the authorization cache, then an authorization indicator is retrieved from the record. The authorization indicator indicates whether the same client has previously successfully performed the same file operation on any cached file that is associated with the same ACL.

Based on the authorization indicator, in step 228 a determination is made whether to authorize the client to perform the file operation on the cached file. For example, if the authorization indicator indicates that the same client has previously successfully performed the same file operation on any cached file that is associated with the same ACL, then the client is allowed to perform the requested file operation. If the authorization indicator indicates that the same client has previously been denied the same file operation on any cached file that is associated with the same ACL, then the client is denied to perform the requested file operation.

If a determination is made in step 226 that the authorization cache does not store a record that includes the client identifier, the file operation identifier, and the ACL, then in step 230 the request is sent to a remote server that is configured to authorize performing the file operation on objects associated with the ACL. In some embodiments, the local cache server receiving the request may simply transmit the request to the remote authoritative server. In other embodiments, the local cache server may send one or more messages to the remote authoritative server, either directly or via a remote proxy server, according to a specific protocol that the local cache server and the remote authoritative server use to communicate with each other. The one or more messages may include information extracted from the request (such as, for example, a file identifier of the cached file, the client identifier, and the file operation requested by the client), and may request that the remote authoritative server make an authorization decision regarding the requested file operation.

In step 232, a response is received from the remote authoritative server. The response includes information indicating whether the remote authoritative server authorizes the client to perform the file operation on the cached file. Based on the information included in the response, in step 234 the local cache server determines whether to authorize the file operation on the cached file. In some embodiments, the local cache server may extract the information, and may then simply retransmit the response to the client. In embodiments where the local cache server and the remote authoritative server communicate over a specific protocol, the local cache server may proceed with processing the request from the client according to the information included in the response from the remote authoritative server (e.g. the local cache server may allow or reject the file operation on the cached file).

Based at least on the information included in the response from the remote authoritative server, in step 236 the local cache server determines an authorization indicator which indicates whether the client is authorized to perform the requested file operation. In some embodiments, the local cache server determines the authorization indicator based on whether the client successfully performs the file operation on the cached file. In other embodiments, the local cache server may determine the authorization indicator based on the information included in the response from the remote authoritative server. In these embodiments, if the client is authorized to perform the file operation on the cached file, the local cache server may perform the operation on behalf of the client.

In step 238, a record is stored in the authorization cache. The record includes the client identifier, the file operation identifier, and the ACL of the cached file as a key. The record also includes the authorization indicator which indicates whether the client succeeded or failed to perform the file operation on the cached file. In this way, the record maps the tuple {client identifier, file operation identifier, ACL} to the authorization indicator. When subsequently the client attempts to perform a file operation on a cached file, the record may be used to determine whether to authorize the file operation locally without sending any requests or messages to the remote authoritative server over possibly slow communication links. In some embodiments, the record in the authorization cache may also store a time-to-live indicator that indicates whether the authorization indicator stored in the record has expired.

For example, when the local cache server receives a request to perform a file operation on a cached file, based on the request the local cache server may determine the identity of the client, the file operation, and the ACL of the cached file on which the operation is to be performed. The local cache server may hash the client identifier, the file system identifier, and the ACL into the authorization cache, and may determine whether a record exists that maps the {client identifier, file operation identifier, ACL} tuple to an authorization indicator. If a record is found and the authorization indicator in the record indicates a "success", then the client may be locally authorized to perform the file operation on the cached file. If the authorization indicator indicates a "failure", then the client may be locally denied to perform the operation on the cached file.

3.1 Retrieving and Caching ACLs

The techniques for local access authorization described herein may be used for processing and authorizing requests conforming to any protocol that uses ACLs to authorize access and that provides mechanisms for querying and retrieving ACLs associated with cached objects. According to the techniques described herein, an ACL is processed as a binary string of data that can be queried for and retrieved from an object and that can be compared to other previously stored ACLs or any other binary strings. Thus, the techniques described herein do not require detailed knowledge of the ACL structure.

In some embodiments, a mechanism is provided for caching the set of distinct ACLs that are associated with objects stored in a local cache. In this embodiment, the set of distinct ACLs associated with cached objects may be stored in a separate table or in another data structure within the cache. With each cached object, the cache may store a pointer or other reference to the particular ACL in the set of cached distinct ACLs with which that object is associated. The pointer or reference stored with a particular cached object may then be used to retrieve the associated ACL when a request to perform an operation on that object is received. In this way, a relatively large number of cached objects may be efficiently associated with a relatively few, but distinct, cached ACLs. Further, this type of caching distinct ACLs separately from cached objects provides for fast lookup and fast processing of local access authorization requests to cached objects.

In some embodiments, the validity of cached ACLs may be governed by a "freshness" policy. A time-to-live indicator may be associated with each cached ACL. A time-to-live indicator associated with a given ACL may represent a period of time during which an operation can be safely performed on a cached object that is associated with that ACL. The time-to-live indicator may be a Boolean value indicating whether the ACL has expired, or may be a value specifying the length of a particular "freshness" period for that particular ACL. For example, the time-to-live indicator may be associated with the properties of the cached object and may reflect the access pattern to the object (e.g. a cached object that is validated frequently would have a time-to-live indicator indicating a shorter period of time).

In some embodiments, the techniques for local access authorization described herein may be used in conjunction with protocols that provide ACL change notification mechanisms. For example, in some protocols, whenever an ACL associated with an object changes, a remote authoritative server may send, either directly or via remote proxies, a message notifying local cache servers of the ACL change. According to the techniques described herein, local cache servers may use such notifications to store or remove certain ACLs from the cache. Alternatively, the local cache servers may use such notifications to implement the "freshness" policy governing the caching of ACLs. For example, in response to receiving a notification from a remote authoritative server that an ACL associated with a cached object has changed, the local cache server may expire the ACL by modifying its time-to-live indicator accordingly.

3.2 Maintaining Authorization Cache Records

The techniques for local access authorization described herein provide for storing records that map {entity ID, operation ID, ACL} tuples to authorization indicators. In some embodiments, an authorization cache may be provided for storing such records. In other embodiments, such records may be stored in any computer-readable medium that is accessible by a local cache server, such as, for example, volatile memory or fast persistent storage.

The techniques described herein may be implemented for any entity that is capable of providing authorization credentials to perform an operation on a cached object. Examples of such entities include, but are not limited to, users, software clients, hardware clients, network interfaces, servers, services, software applications, computer system processes, and mobile devices such as wireless telephones and Personal Digital Assistants (PDAs).

Further, the operation on the cached object may conform to a wide variety of protocols. Typically, in such protocols a user may be identified by session parameters (e.g. source IP address, socket, etc.) or request parameters (e.g. user id field, subset of a cookie value, such as cookie values used in HTTP.)

For example, depending on the particular underlying protocol, the entity may be a user that is identified by a user ID. In another example, the entity may be identified by a Transmission Control Protocol/Internet Protocol (TCP/IP) socket on a local cache server that maintains a cache of objects, where the socket is used by a client to connect to the local cache server.

Thus, the techniques described herein are not limited to being implemented for any particular type of entity. As long as a local cache server can discern between entities as determined by the provided credentials (either from the entities themselves or from the underlying protocols) and is capable of uniquely identifying a particular entity based on particular credentials, the local cache server would be capable of implementing the techniques for local access authorization described herein even if the local cache server is not aware of all the details associated with such credentials.

For example, the techniques described herein may be implemented for operations that conform to a Common Internet File System (CIFS) protocol. The latest version of the CIFS protocol as of this writing is described in *Common Internet File System (CIFS), Technical Reference, Revision 1.0*, published by the Storage Networking Industry Association (SNIA) on Mar. 1, 2002, the entire contents of which are hereby incorporated by reference for all purposes as if originally set forth herein. A local cache server supporting CIFS operations on cached objects may use a user ID or a TCP/IP socket to identify an entity connected to the server. (A TCP/IP socket is a combination of a TCP port and an IP address in a computer system over which the computer system communicates with another computer system.) According to the techniques described herein, if a local cache server that supports CIFS operations on cached objects uses user IDs to identify users that perform operations on the objects, the local cache server may persist the user IDs and may identify the users across multiple connections and across connection resets or restarts. If a local cache server that supports CIFS operations on cached objects uses TCP/IP sockets to identify clients, the local cache server may have to remove from its authorization cache any records storing a particular TCP/IP socket as an entity identifier whenever the connection to that TCP/IP socket is closed or torn down.

In another example, the techniques described herein may be implemented for operations that conform to a Network File System (NFS) protocol. The NFS protocol was originally developed by Sun Microsystems, Inc. to allow network users transparent access to shared files that may be stored on computer systems across one or more networks. One version of the NFS protocol, version 3, is defined in *RFC*1813 that was published by the Internet Engineering Task Force (IETF) in June 1995, the entire contents of which are hereby incorporated by reference for all purposes as if originally set forth herein. All NFS operations are performed over a Remote Procedure Call (RPC) mechanism, and each RPC request includes some authentication parameters. In various NFS implementations, the authentication parameters in RPC requests may be based on UNIX-type authentication (e.g., user ID, group ID, and others bits), Kereberos passwords, and DES5 authentication mechanism. Thus, according to the techniques described herein, a local cache server that supports NFS operations on cached objects may treat the authentication parameters in NFS RPC requests as opaque data and may use these authentication parameters to identify the entities that send the RPC requests. For example, the local cache server may use user identifiers and/or group identifiers to identify entities connected to the server when the particular NFS implementation uses RPC requests that include UNIX-type authentication parameters.

The techniques described herein may be implemented for a wide variety of operations that can be performed on cached objects. In some embodiments, the operations performed on cached objects may be application-specific or protocol-specific. For example, a local cache server may manage a cache of file system objects, such as files and directories, and may support CIFS operations on the cached objects. Examples of such CIFS operations include, but are not limited to, "OPEN" (operation ID "0x02"), "CLOSE" (operation ID "0x04"), "DELETE" (operation ID "0x06"), "READ" (operation ID "0x0A"), and "WRITE" (operation ID "0x0"). Further, in some embodiments an operation ID stored in a record may indicate operation parameters in addition to an operation itself. For example, a stored operation ID for a CIFS "OPEN" operation may also indicate whether the "OPEN" operation is for reading only or for reading and writing. Thus, in this example an "OPEN" operation for reading would be identified by a different operation ID than an "OPEN" operation for reading and writing.

The techniques described herein provide for storing, in an authorization cache, records that map {entity ID, operation ID, ACL} tuples to authorization indicators. An authorization indicator is a value that indicates whether an entity identified by the entity ID stored in the record has previously successfully performed the operation identified by the operation ID stored in the record on any cached object that is associated with the ACL stored in the record. In different embodiments, the authorization indicator stored in a record may be a simple Boolean value (e.g. "success" or "failure") or it may be a value of any data type that is capable of being associated with a {entity ID, operation ID, ACL} tuple.

According to the techniques described herein, a record in the authorization cache may also store an authorization time-to-live indicator. The authorization time-to-live indicator indicates whether the authorization indicator stored in the record has expired. For example, an authorization time-to-live indicator may be set to reflect different expiration periods for a "success" and a "failure" authorization indicator. In addition, in some embodiments time-to-live indicators that indicate the "freshness" of ACLs may also be stored in the record. In these embodiments, an authorization resolution of whether it is safe to perform an operation identified in a record on an object associated with the ACL stored in the record may be based on both the authorization time-to-live indicator and the time-to-live indicator that indicates the "freshness" of that ACL. For example, an ACL stored in a record may stay "fresh" and valid for a long time, but the authorization time-to-live indicator may be set to expire when the entity identified in the record leaves and/or joins a particular security group.

In some embodiments, a time-to-live indicator stored in a record may be a value that reflects whether the entity ID and the ACL stored in the record are both valid. In these embodiments, a time-to-live indicator stored in a record may be set to indicate that the authorization indicator in the record has expired when either the ACL has become invalid or when it is detected that the authorization credentials of the entity identified by the entity ID stored in the record have changed.

For example, a local cache server may receive notification from a remote authoritative server that the ACL associated with a particular cached object has changed. In another example, the local cache server may detect, or may receive a notification from a remote authoritative server, that the entity ID associated with a particular entity has changed because, for instance, the roles or groups to which the entity belongs have changed. In both of the above examples, the local cache server may set the time-to-live indicators in records which store the changed ACL or the changed entity ID to indicate that the authorization indicators in these records have expired.

The techniques for local access authorization described herein provide for maintaining, in an authorization cache, records that map {entity ID, operation ID, ACL} tuples to authorization indicators and/or time-to-live indicators. In some embodiments, such records may be stored in authorization cache tables. In other embodiments, such records may be stored in any type of data structure that may be used to map {entity ID, operation ID, ACL} tuples to authorization indicators. Thus, the examples of authorization cache tables described hereinafter are to be regarded in an illustrative rather that a restrictive sense.

FIG. 3A is a block diagram that illustrates an overview of the structure of a global authorization cache table according to one embodiment. In this embodiment, global authorization cache table 300 stores records for a plurality of entities that may send streams of requests for performing operations on cached objects.

In FIG. 3A, global authorization cache table 300 comprises column 310 ("Entity ID"), column 312 ("Operation ID"), column 314 ("ACL"), column 316 ("Authorization Indicator"), and column 318 ("Time-to-Live Indicator"). Table 300 stores one or more records such as record 303; ellipsis 305 indicates that table 300 may store any number of such records. Columns 310, 312, and 314 comprise the key of table 300, that is, each record in table 300 can be uniquely identified and located in the table based on the values in columns 310, 312, and 314.

For each record in table 300, column 310 stores a value identifying a specific entity, column 312 stores a value identifying a specific operation, column 314 stores a specific ACL, column 316 stores an authorization indicator, and column 318 stores a time-to-live indicator that indicates whether the authorization indicator stored in column 316 is valid. For example, for record 303, the entity ID value is "2110791508", the operation ID is "OPEN_FILE", the ACL is "0x801F000", the authorization indicator is "success" (which indicates that entity "2110791508" has previously successfully performed an "OPEN_FILE" operation on a cached object associated with an ACL represented by the binary string "0x801F0000"), and the time-to-live indicator indicates that the authorization indicator is valid and is not expired. (In FIG. 3A, the values provided in columns 310, 312, 314, 316, and 318 may not be compliant with any specific protocol and are provided for illustration purposes only.)

A local cache server may look up a record in global authorization cache table 300 by performing a hash operation based on an entity ID, operation ID, and an ACL. If the hash operation successfully locates a record in the table, the hash operation returns the authorization indicator in the record identified by the provided entity ID, operation ID, and ACL.

FIG. 3B is a block diagram that illustrates an overview of the structure of a per-entity authorization cache table according to one embodiment. In this embodiment, authorization cache table 320 stores records for a single entity that may send requests for performing operations on cached objects.

In FIG. 3B, authorization cache table 320 comprises column 322 ("Operation ID"), column 324 ("ACL"), column 326 ("Authorization Indicator"), and column 328 ("Time-to-Live Indicator"). Table 320 stores one or more records such as record 323; ellipsis 325 indicates that table 320 may store any number of such records. Columns 322 and 324 comprise the key of table 320, that is, each record in table 320 can be uniquely identified and located in the table based on the values in columns 322 and 324.

Each record in table 320 is associated with the same entity. For each record in table 320, column 322 stores a value identifying a specific operation, column 324 stores a specific ACL, column 326 stores an authorization indicator, and column 328 stores a time-to-live indicator that indicates whether the authorization indicator stored in column 326 is valid. For example, for record 323, the operation ID is "OPEN_FILE", the ACL is "0x801F0000", the authorization indicator is "success", and the time-to-live indicator indicates that the authorization indicator is valid and is not expired. A local cache server may look up a record in authorization cache table 320 by first identifying the table based on an entity ID that is received in a request to perform an operation on a cached object. After identifying table 320, the local cache server may perform a hash operation based on the operation ID and the ACL indicated by the request. If the hash operation successfully locates a record in the table, it returns the authorization indicator in the record identified by the provided operation ID and ACL.

In some embodiments, instead of storing a value representing an authorization indicator, a record in an authorization cache table may store a bitmap value, where one or more sets of bits represent whether one or more particular operations have been successfully performed. In these embodiments, the authorization cache table may be a global authorization table in which the key of the table would be an entity ID and an ACL. Alternatively, the authorization cache table may be a per-entity authorization table in which the key of the table would be an ACL only. Depending on the particular requirements with respect to the number of entities and the number of cached objects that an embodiment of the techniques described herein need to support, any one the above mechanisms may be selected in order to provide for the most efficient utilization of cache or storage space and for the fastest processing of local access authorization requests.

3.3 Processing Local Authorization Requests

According to the techniques described herein, local authorization of a request from an entity to perform an operation on a cached object is based on an authorization indicator which indicates whether the same entity has previously successfully performed the same operation on any cached object associated with the same ACL. The authorization indicator may be stored in a record in an authorization cache, where the record may be located in the cache based on the identity of the entity, the identity of the requested operation, and the ACL associated with the cached object. In some embodiments, the record may also store a time-to-live indicator which indicates whether the authorization indicator has expired.

In one such embodiment, suppose that a local cache server, such as local cache server 156 depicted in FIG. 1B, receives a request to perform an operation on an object stored in a local cache. Based on the request, the local cache server determines an entity ID associated with the entity that sent the request, the operation ID of the requested operation, and the ACL of the cached object. The local cache server, or one or more of its components (such as local authorization component 110 depicted in FIG. 1B), then perform a look-up in an authorization cache table to determine whether the authorization cache table stores a record that maps the entity ID, the operation ID, and the ACL to an authorization indicator.

If such a record is not located in the authorization cache, then the local cache server sends a request to a remote authoritative server to authorize the requested operation. The remote authoritative server, such as, for example, remote server 162 depicted in FIG. 1B, is configured to authorize performing the operation on objects cached by the local cache server. The remote authoritative server sends back a response, which indicates whether the remote server authorizes the entity to perform the operation on the cached object. Based on the response, the local cache server processes the request for the operation on the cached object. If the response indicates that the entity is authorized to perform the operation, then the local cache server performs the operation on behalf of the entity. In addition, the local authorization component in the local cache server may create, and store in the authorization cache, a record that maps the entity ID, the operation ID, and the ACL of the cached object to an authorization indicator that reflects the result of the authorization performed by the remote authoritative server and indicated in the received response.

If a record, which maps the entity ID, the operation ID, and the ACL to an authorization indicator, is located in the authorization cache, then the time-to-live indicator stored in the record is checked to determine whether the authorization indicator stored in the record has expired. If a determination is made that the authorization indicator has expired, then a request is sent to the remote authoritative server to re-authorize the requested operation. The remote authoritative server sends back a response, which indicates whether the remote server authorizes the entity to perform the operation on the cached object. Based on the response, the local authorization component in the local cache server generates a new authorization indicator. The new authorization indicator reflects the result of the latest authorization performed by the remote authoritative server. The local authorization component then updates the record in the authorization cache to include the new authorization indicator. Based on the updated record, the local authorization component then determines whether to authorize the entity to perform the requested operation on the cached object. If the local authorization component authorizes the operation, the local cache server may perform the operation on behalf of the entity. Otherwise, the local cache server may send a response back to the entity rejecting the operation.

If a record, which maps the entity ID, the operation ID, and the ACL to an authorization indicator, is located in the authorization cache and the time-to-live indicator in the record indicates that the authorization indicator stored in the record has not expired, the local authorization component then determines, based on the authorization indicator, whether to authorize the entity to perform the requested operation on the cached object. If the local authorization component authorizes the operation, the local cache server may perform the operation on behalf of the entity. Otherwise, the local cache server may send a response back to the entity rejecting the operation.

4.0 Implementation Mechanisms—Hardware Overview

Figure 4:
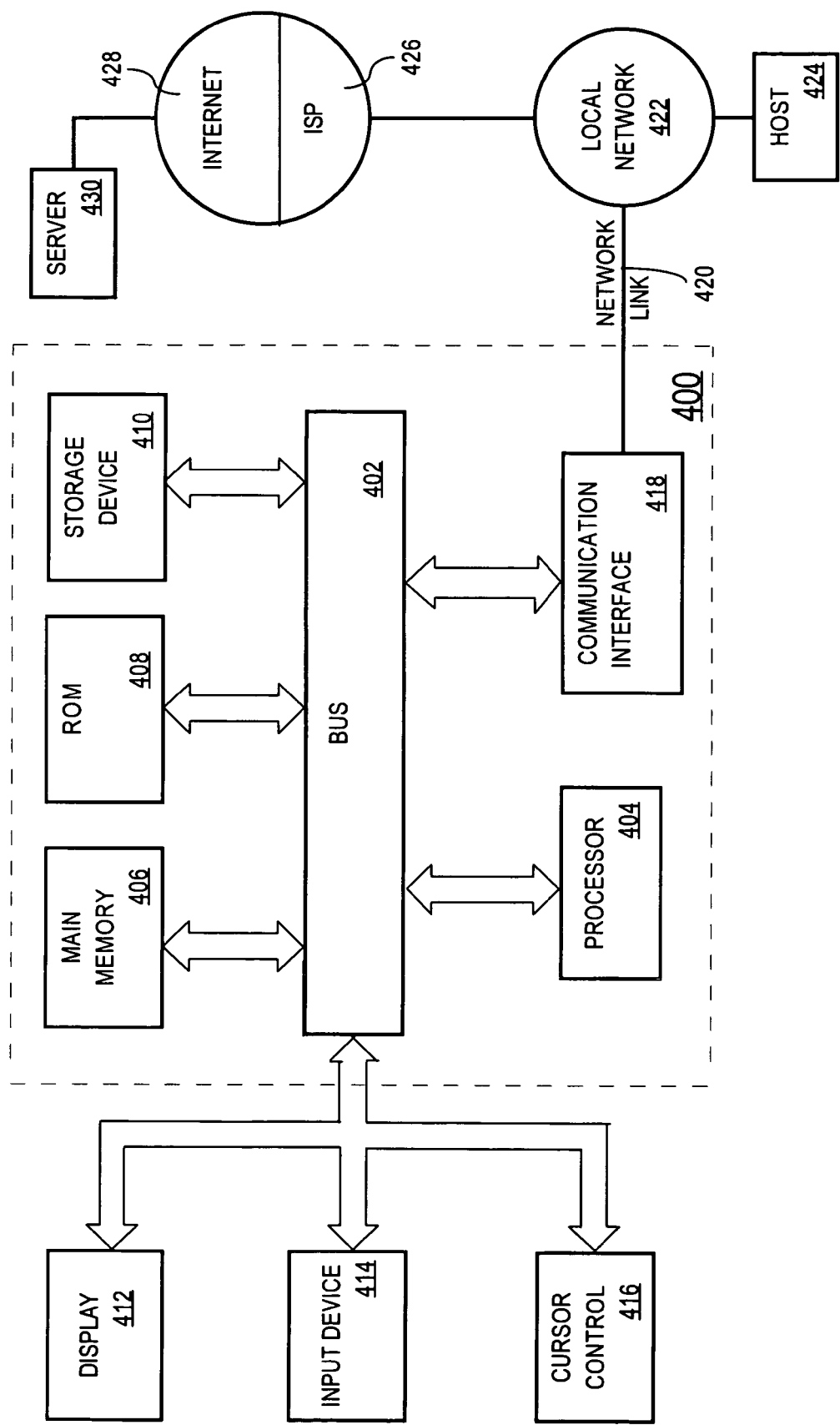
FIG. 4 is a block diagram that illustrates a computer system upon which an embodiment may be implemented.

FIG. 4 is a block diagram that illustrates a computer system 400 upon which an embodiment of the invention may be implemented. The embodiment is implemented using one or more computer programs running on a network element such as, for example, a switch or a router device that is providing local cache services. Thus, in this embodiment, the computer system 400 may be a router that is also performing the functions of a local cache server.

Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for local access authorization of cached resources. According to one embodiment of the invention, local access authorization of cached resources is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for local access authorization of cached resources as described herein.

The received code may be executed by processor 404 as it is received, and/or stored in storage device 410, or other non-volatile storage for later execution. In this manner, computer system 400 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An apparatus, comprising:
one or more processors;
one or more computer-readable volatile or non-volatile media operable to store a cache; and
one or more sequences of instructions which are stored in the one or more computer-readable volatile or non-volatile media and which, when executed by the one or more processors, cause the one or more processors to perform:

receiving a first request to perform an operation on a first object that is stored in the cache;

based on the first request, determining an entity identifier associated with an entity that sent the first request, an operation identifier associated with the operation, and an Access Control List (ACL) associated with the first object;

accessing a record that includes at least the operation identifier, the ACL, and an authorization indicator, wherein the authorization indicator indicates whether the entity has previously successfully performed the operation on any object that is different than the first object and that is also associated with the ACL; and based on the authorization indicator included in the record, determining whether to authorize the entity to perform the operation on the first object without evaluating any permissions and access rights that are stored in the ACL.

2. The apparatus of claim 1, wherein the one or more sequences of instructions that cause the one or more processors to perform accessing the record comprise sequences of instructions which, when executed by the one or more processors, cause the one or more processors to perform:

based on the entity identifier, the operation identifier, and the ACL, determining whether the record is stored in an authorization cache; and if the record is not stored in the authorization cache, then performing the steps of:

sending an authorization request to a remote server, wherein the remote server is configured to authorize performing the operation on objects associated with the ACL;

receiving a response from the remote server, wherein the response indicates whether the remote server authorizes the entity to perform the operation on the first object;

based at least on the response, generating the authorization indicator; and creating and storing the record in the authorization cache.

3. The apparatus of claim 2, further comprising sequences of instructions which are stored in the one or more computer-readable volatile or non-volatile media and which, when executed by the one or more processors, cause the one or more processors to perform:

receiving, from the entity, a second request to perform the operation on a second object that is stored in the cache, wherein the second object is also associated with the ACL;

based on the entity identifier, the operation identifier, and the ACL, locating the record in the authorization cache; and based on the authorization indicator included in the record, determining whether to authorize the entity to perform the operation on the second object.

4. The apparatus of claim 3, wherein the second object is the same as the first object.

5. The apparatus of claim 1, wherein:

the record further includes a time-to-live indicator, wherein the time-to-live indicator indicates whether the authorization indicator has expired; and the one or more sequences of instructions that cause the one or more processors to perform accessing the record comprise sequences of instructions which, when executed by the one or more processors, cause the one or more processors to perform:

locating the record in an authorization cache based on the entity identifier, the operation identifier, and the ACL;

determining whether the time-to-live indicator stored in the record indicates that the authorization indicator has expired; and if the authorization indicator has expired, then performing the steps of:

sending an authorization request to a remote server, wherein the remote server is configured to authorize performing the operation on objects associated with the ACL;

receiving a response from the remote server, wherein the response indicates whether the remote server authorizes the entity to perform the operation on the first object;

based at least on the response, generating a new authorization indicator; and storing the new authorization indicator in the record.

6. The apparatus of claim 5, further comprising sequences of instructions which are stored in the one or more computer-readable volatile or non-volatile media and which, when executed by the one or more processors, cause the one or more processors to perform setting the time-to-live indicator to indicate that the authorization indicator has expired in response to at least one of:

receiving a notification that the ACL was changed relative to a particular object that was associated with the ACL;

detecting that the entity identifier was changed; and an expiration of a certain period of time.

7. The apparatus of claim 1, wherein the entity is any one of a user, a client, an application, and a process that is capable of being uniquely identified based on the first request.

8. The apparatus of claim 1, wherein the first request is received from a client that is communicatively connected to the apparatus over a Local Area Network (LAN).

9. The apparatus of claim 1, wherein:

the cache stores a plurality of file system objects, wherein the first object is one of the plurality of file system objects; and the first object is any one of a file and a directory.

10. The apparatus of claim 1, wherein the operation is one of a plurality of operations that are supported by any one of a Common Internet File System Protocol (CIFS), a Network File System (NFS) protocol, and a Web-based Distributed Authoring and Versioning (WebDAV) protocol.

11. The apparatus of claim 1, wherein the apparatus is communicatively connected to a remote server over a Wide Area Network (WAN), wherein the remote server is configured to authorize performing the operation on objects associated with the ACL.

12. The apparatus of claim 1, further comprising sequences of instructions which are stored in the one or more computer-readable volatile or non-volatile media and which, when executed by the one or more processors, cause the one or more processors to execute a server that is configured to authorize performing the operation on objects associated with the ACL.

13. The apparatus of claim 1, further comprising sequences of instructions which are stored in the one or more computer-readable volatile or non-volatile media and which, when executed by the one or more processors, cause the one or more processors to perform storing a plurality of distinct ACLs in the cache, wherein:

the plurality of distinct ACLs includes the ACL; and for each object stored in the cache, the cache stores a reference to a particular ACL of the plurality of distinct ACLs that is associated with that object.

14. An apparatus for local access authorization of cached resources, comprising:

one or more processors;

one or more computer-readable volatile or non-volatile media operable to store a cache, wherein the cache includes an authorization cache; and one or more sequences of instructions which are stored in the one or more computer-readable volatile or non-volatile media and which, when executed by the one or more processors, cause the one or more processors to perform:

receiving, from an entity, a first request to perform an operation on a first object that is stored in the cache;

performing the operation on the first object, wherein performing the operation comprises:

sending an authorization request to a remote authorization server, wherein the remote authorization server is capable of authorizing the entity to perform the operation on the first object; and receiving a response from the remote authorization server, wherein the response indicates whether the remote authorization server authorizes the entity to perform the operation on the first object;

generating an authorization indicator based at least on the response, wherein the authorization indicator indicates whether the operation was successfully performed on the first object;

storing, in the authorization cache, a record that includes an entity identifier associated with the entity, an operation identifier associated with the operation, an Access Control List (ACL) associated with the first object, and the authorization indicator;

receiving a second request from the entity to perform the operation on a second object that is stored in the cache, wherein the second object is also associated with the ACL and wherein the second object is different than the first object;

determining the entity identifier, the operation identifier, and the ACL based on information included in the second request;

based on the entity identifier, the operation identifier, and the ACL, locating the record in the authorization cache; and based on the authorization indicator stored in the record, determining whether to authorize the entity to perform the operation on the second object without evaluating any permissions and access rights that are stored in the ACL.

15. The apparatus of claim 14, wherein:

the one or more stored sequences of instructions comprise sequences of instructions which, when executed by the one or more processors, cause the one or more processors to perform executing a local proxy server that manages the cache;

the local proxy server is communicatively connected to one or more clients over a first Local Area Network (LAN), wherein a particular client of the one or more clients sends the first request and the second request;

the local proxy server is communicatively connected to a remote proxy server over a Wide Area Network (WAN); and the remote proxy server is communicatively connected to the remote authorization server over a second LAN.

16. The apparatus of claim 14, wherein:

the one or more stored sequences of instructions comprise sequences of instructions which, when executed by the one or more processors, cause the one or more processors to perform executing a local cache server that manages the cache; and the local cache server is communicatively connected to the remote authorization server over a Local Area Network (LAN).

17. An apparatus for local access authorization of cached resources, comprising:

means for receiving a first request to perform an operation on a first object that is stored in a cache;

means for determining, based on the first request, an entity identifier associated with an entity that sent the first request, an operation identifier associated with the operation, and an Access Control List (ACL) associated with the first object;

means for accessing a record that includes at least the operation identifier, the ACL, and an authorization indicator, wherein the authorization indicator indicates whether the entity has previously successfully performed the operation on any object that is different than the first object and that is also associated with the ACL; and means for determining, based on the authorization indicator included in the record, whether to authorize the entity to perform the operation on the first object without evaluating any permissions and access rights that are stored in the ACL.

18. The apparatus of claim 17, wherein the means for accessing the record comprise:

means for determining whether the record is stored in an authorization cache based on the entity identifier, the operation identifier, and the ACL;

wherein, if the record is not stored in the authorization cache, the means for accessing the record comprise:

means for sending an authorization request to a remote server, wherein the remote server is configured to authorize performing the operation on objects associated with the ACL;

means for receiving a response from the remote server, wherein the response indicates whether the remote server authorizes the entity to perform the operation on the first object;

means for generating the authorization indicator based at least on the response; and means for creating and storing the record in the authorization cache.

19. The apparatus of claim 18, further comprising:

means for receiving, from the entity, a second request to perform the operation on a second object that is stored in the cache, wherein the second object is also associated with the ACL;

means for locating the record in the authorization cache based on the entity identifier, the operation identifier, and the ACL; and means for determining, based on the authorization indicator included in the record, whether to authorize the entity to perform the operation on the second object.

20. The apparatus of claim 19, wherein the second object is the same as the first object.

21. The apparatus of claim 17, wherein:

the record further includes a time-to-live indicator, wherein the time-to-live indicator indicates whether the authorization indicator has expired; and the apparatus further comprises:
  means for locating the record in an authorization cache based on the entity identifier, the operation identifier, and the ACL; and
  means for determining whether the time-to-live indicator stored in the record indicates that the authorization indicator has expired;
wherein, if the authorization indicator has expired, the apparatus further comprises:
  means for sending an authorization request to a remote server, wherein the remote server is configured to authorize performing the operation on objects associated with the ACL;
  means for receiving a response from the remote server, wherein the response indicates whether the remote server authorizes the entity to perform the operation on the first object;
  means for generating a new authorization indicator based at least on the response; and
  means for storing the new authorization indicator in the record.

22. The apparatus of claim 21, further comprising means for setting the time-to-live indicator to indicate that the authorization indicator has expired in response to at least one of:
  receiving a notification that the ACL was changed relative to a particular object that was associated with the ACL;
  detecting that the entity identifier was changed; and
  an expiration of a certain period of time.

23. The apparatus of claim 17, wherein the entity is any one of a user, a client, an application, and a process that is capable of being uniquely identified based on the first request.

24. The apparatus of claim 17, wherein the first request is received from a client that is communicatively connected to the apparatus over a Local Area Network (LAN).

25. The apparatus of claim 17, wherein:
  the cache stores a plurality of file system objects, wherein the first object is one of the plurality of file system objects; and
  the first object is any one of a file and a directory.

26. The apparatus of claim 17, wherein the operation is one of a plurality of operations that are supported by any one of a Common Internet File System Protocol (CIFS), a Network File System (NFS) protocol, and a Web-based Distributed Authoring and Versioning (WebDAV) protocol.

27. The apparatus of claim 17, wherein the apparatus is communicatively connected to a remote server over a Wide Area Network (WAN), wherein the remote server is configured to authorize performing the operation on objects associated with the ACL.

28. The apparatus of claim 17, further comprising means for executing a server that is configured to authorize performing the operation on objects associated with the ACL.

29. The apparatus of claim 17, further comprising means for storing a plurality of distinct ACLs in the cache, wherein:
  the plurality of distinct ACLs includes the ACL; and
  for each object stored in the cache, the cache stores a reference to a particular ACL of the plurality of distinct ACLs that is associated with that object.

30. A method of local access authorization of cached resources, the method comprising the computer-implemented steps of:
  receiving a first request to perform an operation on a first object that is stored in a cache;
  based on the first request, determining an entity identifier associated with an entity that sent the first request, an operation identifier associated with the operation, and an Access Control List (ACL) associated with the first object;
  accessing a record that includes at least the operation identifier, the ACL, and an authorization indicator, wherein the authorization indicator indicates whether the entity has previously successfully performed the operation on any object that is different than the first object and that is also associated with the ACL; and
  based on the authorization indicator included in the record, determining whether to authorize the entity to perform the operation on the first object without evaluating any permissions and access rights that are stored in the ACL.

31. A method as recited in claim 30, wherein accessing the record comprises:
  based on the entity identifier, the operation identifier, and the ACL, determining whether the record is stored in an authorization cache; and
  if the record is not stored in the authorization cache, then performing the steps of:
    sending an authorization request to a remote server, wherein the remote server is configured to authorize performing the operation on objects associated with the ACL;
    receiving a response from the remote server, wherein the response indicates whether the remote server authorizes the entity to perform the operation on the first object;
    based at least on the response, generating the authorization indicator; and
    creating and storing the record in the authorization cache.

32. A method as recited in claim 31, further comprising:
  receiving, from the entity, a second request to perform the operation on a second object that is stored in the cache, wherein the second object is also associated with the ACL;
  based on the entity identifier, the operation identifier, and the ACL, locating the record in the authorization cache; and
  based on the authorization indicator included in the record, determining whether to authorize the entity to perform the operation on the second object.

33. A method as recited in claim 30, wherein:
  the record further includes a time-to-live indicator, wherein the time-to-live indicator indicates whether the authorization indicator has expired; and
  the step of accessing the record comprises:
    locating the record in an authorization cache based on the entity identifier, the operation identifier, and the ACL;
    determining whether the time-to-live indicator stored in the record indicates that the authorization indicator has expired; and
    if the authorization indicator has expired, then performing the steps of:
      sending an authorization request to a remote server, wherein the remote server is configured to authorize performing the operation on objects associated with the ACL;
      receiving a response from the remote server, wherein the response indicates whether the remote server authorizes the entity to perform the operation on the first object;

based at least on the response, generating a new authorization indicator; and storing the new authorization indicator in the record.

34. A method as recited in claim 33, further comprising setting the time-to-live indicator to indicate that the authorization indicator has expired in response to at least one of:

receiving a notification that the ACL was changed relative to a particular object that was associated with the ACL;

detecting that the entity identifier was changed; and an expiration of a certain period of time.

35. A method as recited in claim 30, wherein the entity is any one of a user, a client, an application, and a process that is capable of being uniquely identified based on the first request.

36. A method as recited in claim 30, wherein the first request is received from a client that is communicatively connected to the apparatus over a Local Area Network (LAN).

37. A method as recited in claim 30, wherein:

the cache stores a plurality of file system objects, wherein the first object is one of the plurality of file system objects;

the first object is any one of a file and a directory; and the operation is one of a plurality of operations that are supported by any one of a Common Internet File System Protocol (CIFS), a Network File System (NFS) protocol, and a Web-based Distributed Authoring and Versioning (WebDAV) protocol.

38. A method as recited in claim 30, further comprising storing a plurality of distinct ACLs in the cache, wherein:

the plurality of distinct ACLs includes the ACL; and for each object stored in the cache, the cache stores a reference to a particular ACL of the plurality of distinct ACLs that is associated with that object.

* * * * *